United States Patent [19]

Mitchell

[11] Patent Number: 4,922,649
[45] Date of Patent: May 8, 1990

[54] FISH HOOK WITH RETRACTABLE BARB

[76] Inventor: Jack H. Mitchell, 80 N. Policy St., Salem, N.H. 03079

[21] Appl. No.: 331,859

[22] Filed: Apr. 3, 1989

[51] Int. Cl.⁵ .............................................. A01K 83/00
[52] U.S. Cl. .................................... 43/43.16; 43/43.4
[58] Field of Search .................... 43/43.16, 43.4, 53.5, 43/5, 37

[56] References Cited

U.S. PATENT DOCUMENTS

| | | | |
|---|---|---|---|
| 2,217,928 | 10/1940 | Ward | 43/43.16 |
| 2,823,486 | 2/1958 | Behee | 43/43.16 |
| 2,896,359 | 7/1959 | Lanthier | 43/43.16 |
| 2,984,041 | 5/1961 | Banker | 43/43.16 |
| 3,027,676 | 4/1962 | Buttemier | 43/43.16 |
| 3,505,756 | 4/1970 | Bowden | 43/43.16 |
| 3,624,690 | 11/1971 | Ashley | 43/43.16 |
| 3,755,954 | 9/1973 | Lucius | 43/43.16 |
| 3,758,976 | 9/1973 | Szwolkon | 43/43.16 |
| 3,827,174 | 8/1974 | Banker | 43/53.5 |
| 4,126,957 | 11/1978 | Randall | 43/43.16 |
| 4,768,304 | 9/1988 | Preiser | 43/43.16 |

FOREIGN PATENT DOCUMENTS 130308 7/1931 United Kingdom ................ 43/43.4

Primary Examiner—Kurt Rowan
Attorney, Agent, or Firm—Joseph E. Funk

[57] ABSTRACT

What is described is a hollow fish hook with a flexible, retractable barb. A barb retraction wire passes through the hollow fish hook and is connected to the barb. A leader wire is also connected to an eye hole in the fish hook. Spaced apart from the fish hook and attached to the leader and to the barb retraction wire are indicator pieces. When the barb retraction wire is pulled the two indicator pieces come closer to each other and touch when the barb is fully retracted. This provides an indication of when the barb is fully retracted.

6 Claims, 1 Drawing Sheet

U.S. Patent
May 8, 1990
4,922,649
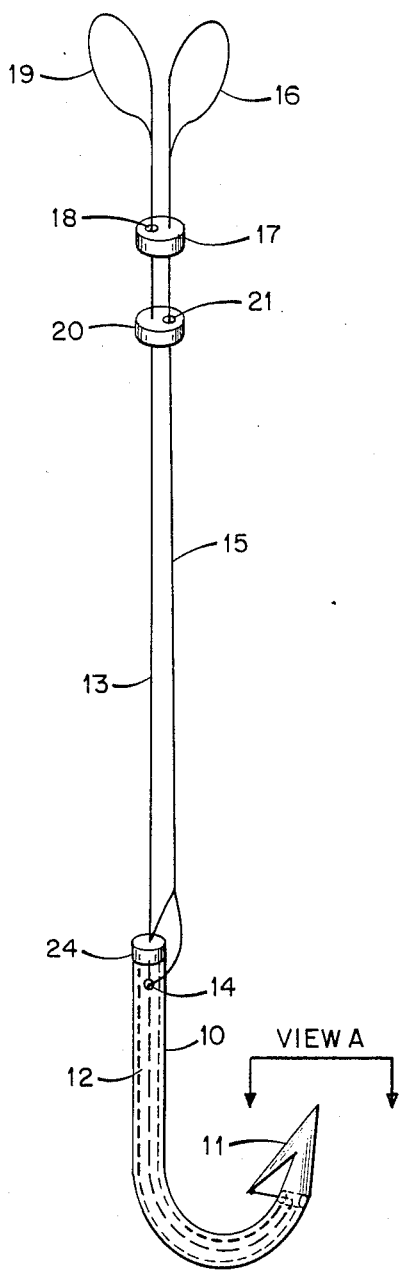
Fig. 1.
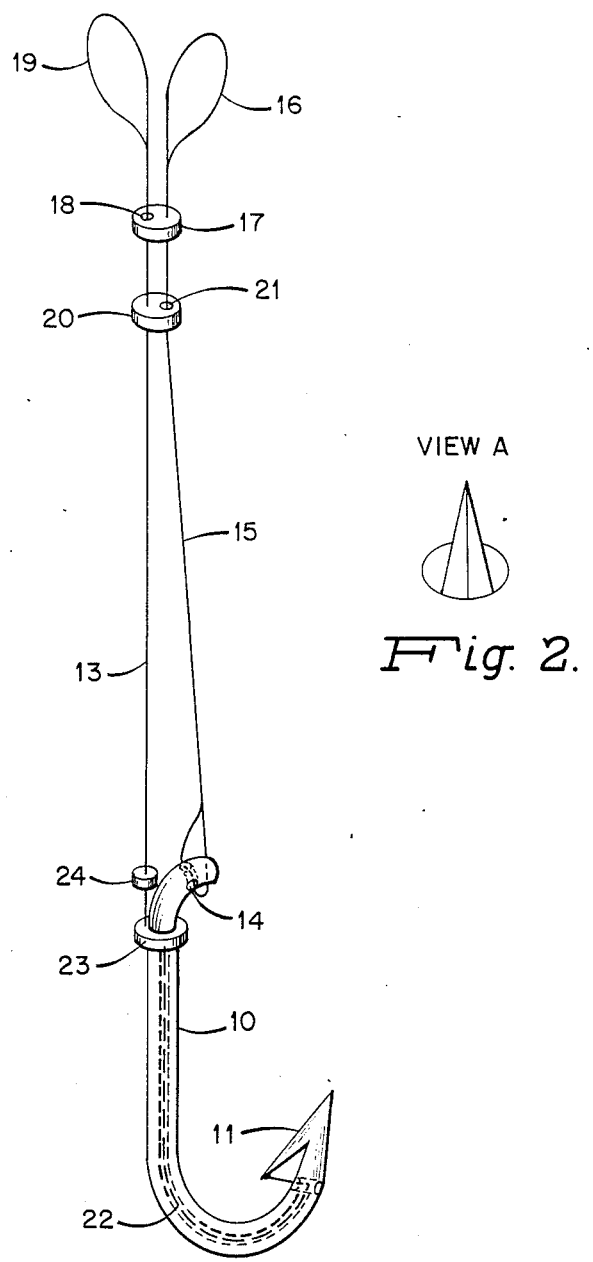
Fig. 2.
Fig. 3.

FISH HOOK WITH RETRACTABLE BARB

FIELD OF THE INVENTION

This invention relates to fish hooks in general, and more specifically to a fish hook with a barb that can be activated to easily release a caught fish.

BACKGROUND OF THE INVENTION

Fish hooks have barbs at their ends, the function of which is to prevent the hook from easily exiting the mouth of a fish after the fish has swallowed bait and the hook on which the bait is located. After a fish has been caught the hook has to be released from the mouth of the fish, but this is often difficult because the barb at the end of the fishhook is lodged inside the fish to prevent its removal, as is its normal function. Removal of a fish hook is easier if the barb is lodged just inside the mouth of the fish, but is difficult and sometimes impossible if the hook has been completely swallowed and is deep inside the fish. Thus, there are times that a fisherman loses their hooks and must dissect a fish to recover it.

While some fisherman catch fish to eat, other fisherman catch fish only for sport and they want to release them with little harm immediately after they are caught. Conventional fish hooks create problems in this regard. First, a fish must be taken out of the water in order to attempt removing a fish hook. This in itself shocks the fish which cannot breathe out of water, and this is compounded if there is any difficulty in removing a hook. Second, if a fish hook is caught deep inside the mouth of a fish by the barb, the hook may not be able to be removed without seriously harming or killing the fish. The only alternative is to cut the line and leave the hook caught inside the fish. This is not the best action to take if the fisherman wants to release a fish relatively unharmed.

In the prior art there are fish hooks with hinged and otherwise rotatable barbs that are moved to allow for easier removal of the fish hook from the mouth of a fish. With one prior art fish hook disclosed and claimed in U.S. Pat. No. 3,505,756 the barb is literally hinged. A fish caught with such a fish hook must be removed from the water and the fisherman must reach inside the mouth of the fish to rotate the barb to a position that permits the fish hook to be removed without causing further harm to the mouth of the fish. This is difficult and sometimes impossible if the hook is caught deep inside the mouth of the fish.

With another prior art fish hook disclosed and claimed in U.S. Pat. No. 2,217,928 the problems of the hinged fish hook are overcome. The fish hook is hollow, the barb is connected to the end of the fish hook by a relatively thin piece of metal, and there is a piece of metal wire inside the hollow fish hook and fastened to the free end of the barb. The wire extends from the barb, and the when of the fish hook furthest from the barb, and when the wire is manually pulled by the fisherman the force is transmitted through the wire to the barb which is retracted to permit the hook to easily be removed from the mouth of the fish. However, if the hook is caught deep inside the mouth of the fish access to the wire is difficult and a pair of long nosed pliers are need to reach inside the mouth of the fish and grasp the wire to pull same and release the barb. With this operation the fish must be taken out of the water to remove the barb when the hook is caught deep inside the mouth of the fish. In addition, if the wire that actuates moving of the barb is pulled too far, that is the fisherman tries to pull the wire some more after the barb has been retracted as far as it can go, the wire is often broken. The result is a fishhook that has the same problems and shortcomings as fish hook that are not designed to be easily removed from mouth of a fish without seriously harming the fish.

Thus, there is a need in the art for a fish hook with a retractable barb that can always be actuated for easy removal of the hook from the mouth of a fish while the fish remains in the water.

There is also a need for a fish hook with a retractable barb that can easily be removed even if the hook is caught deep inside the mouth of a fish.

Additionally, there is a need for a hollow fish hook with a retractable barb actuated by a wire through the hollow fish hook, where the fisherman receives an indication that the wire has been pulled to the point that the barb is completely retracted, so that no more pressure is placed in the wire that may break the wire and prevent removal of the fish hook from the mouth of the fish without seriously harming the fish.

SUMMARY OF THE INVENTION

The foregoing needs of the prior art are met by the present invention which is a fish hook with retractable barb that may always be actuated without removing a fish from the water. In addition, the barb may easily be retracted even if the fish hook is caught deep within the mouth of a fish. Further, an indication is provided to the fisherman that the barb is completely retracted so that the barb retraction mechanism is not broken, thus preventing easy removal of the fish hook from the mouth of a fish.

More particularly, my novel fish hook with retractable barb is a hollow hook having a piece of wire inside. The wire is used to retract the barb. The barb retraction wire extends well beyond the eyed end of the fish hook opposite the barbed end so that it is easily accessible with a caught fish remaining in the water, and even with the fish hook caught deep inside the mouth of the fish. There is a second wire attached to the eye of the fish hook and it serves as a leader. Crimped onto the barb retraction wire is a first metal piece that has a second hole through which the second wire passes unobstructed. Crimped onto the second wire/leader is a second metal piece that has a second hole through which the barb retraction wire passes unobstructed. The two metal pieces are located on the two wires away from the eye of the fish hook so that they are easily seen even when the fish hook is caught deep in the mouth of a fish. The positions of the two metal pieces on the wires are such that when the barb retraction wire is pulled to retract the barb, when the barb is fully retracted the first metal piece contacts the second metal piece. In this manner a fisherman can see when he has fully retracted the barb and does not apply any more force to the barb retraction wire to break same.

DESCRIPTION OF THE DRAWING

The invention will be better understood upon reading the following detailed description in conjunction with the drawing in which:

FIG. 1 is a side view of the primary embodiment of the fish hook with retractable barb;

FIG. 2 is an end view of the barbed end of the primary embodiment of the fish hook with retractable barb; and FIG. 3 is a side view of an alternative embodiment of the fish hook with retractable barb;

DETAILED DESCRIPTION OF THE INVENTION

In FIG. 1 is seen a side view of the fish hook 10 with retractable barb 11 per the primary embodiment of the invention. Hook 10 and barb 11 are preferably formed of spring steel so that barb 11 may be bent for retraction. As indicated by the dotted lines hook 10 is hollow and creates a channel 12 through which a barb retraction wire 13 extends. At the end of hook 10 is formed barb 11 that has a tapered shape as shown in FIG. 2. This tapered shape and the fact that barb 11 is relatively thin results in a barb that can be bent inward to retract barb 11.

There is a hole 14 through the end of hook 10 furthest from barb 11. One end of a wire leader 15 is connected to hook 10 through hole 14 as shown. The other end of leader wire 15 has a loop 16 to which a fishing line (not shown) may be attached. Leader wire 15 is, several inches long. Crimped, or otherwise permanently attached, to leader wire 15 is a first indicator means in the form of a small first metal piece 17. Metal piece 17 has a second hole 18 through which barb retraction wire 13 passes and can freely move.

Barb retraction wire 13 is preferably made of stainless steel and its end nearest barb 11 exits channel 12 through hook 10 and is welded or soldered to the narrowest end of barb 11. The other end of barb retraction wire 13 extends several inches from channel 12 through hollow hook 10 and has loop 19 in its end. Barb retraction wire 13 has a second indicator means in the form of a second metal piece 20 permanently attached near its end which is furthest away from barb 11 as shown. Second metal piece 20 has a second hole 21 through it and through which leader wire 15 passes and can freely move.

Barb retraction wire 13 has a clip 24 permanently fastened to it just above hook 10, outside of hollow channel 12. Clip 24 limits the travel of wire 13 inside of channel 12 to thereby prevent barb 11 from bending backwards too far under pressure and breaking off.

In use fish hook 10 is tied to a fishing line (not shown) via loop 16 at the end of wire leader 15. Bait (not shown) is placed on hook 10. When a fish is caught barb 11 is hooked inside the mouth of the fish. The fisherman reels in the fish but leaves it in the water. The fisherman holds the fish under the water and pulls barb retraction wire 13 via its loop 19. Wire 13 is pulled until metal piece 20 (second indicator means) fastened thereto travels up to metal piece 17 (first indicator means) crimped to leader 15. The pulled force is transmitted through wire 13 to the end of barb 11 which is pulled inward toward hook to thereby retract the barb. When metal pieces 17 and 20 touch the fisherman knows that barb 11 is fully retracted and does not pull any harder, thus preventing breaking barb retraction wire 13 by excessive pulling force. Hook 10 may then be easily removed from the mouth of the fish.

In FIG. 3 is seen a side view of an alternative embodiment of the novel fish hook 10 with retractable barb 11. In this alternative embodiment hook 10 is not hollow but, rather, has a groove 22 along most of its length on the outside as shown. Barb retraction wire 13 is fastened to barb 11 as previously described and lies in groove 22. Wire 13 is held in groove 22 by a clip 23 which also limits the travel of wire 13 under clip 23 toward barb 22 to thereby prevent wire 13 from coming out of groove 22. The operation of the barb retraction mechanism is as described in previous paragraphs.

While what has been described hereinabove is the preferred embodiment of the invention and one alternative embodiment, it will be recognized by those skilled in the art that many changes may be made without departing from the spirit and scope of the invention. For example, metal pieces need not be attached to the metal wires. Instead, other indication means may be placed on the wires to indicate the amount of travel of the barb retraction wire.

What is claimed is:

1. A fish hook for use with a fishing line, said fish hook comprising:
   a curved, elongated member having a first end and a second end;
   a flexible barb at the second end of said elongated member;
   a barb retraction member which is attached to said barb, said barb retraction member having means spaced from said elongated member that is pulled to apply force to said barb to retract same; and
   indicator means spaced from said elongated member and cooperating with said barb retraction member to indicate when said barb is fully retracted.

2. The invention in accordance with claim 1 further comprising:
   a travel limiting means attached to said barb retraction member and external to said curved, elongated member at said first end thereof, said travel limiting means preventing said barb from bending in a direction opposite to that in which it retracts.

3. A fish hook for use with a fishing line, said fish hook comprising:
   a curved, elongated, hollow member having a first end and a second end;
   a flexible barb at the second end of said hollow member;
   a barb retraction member which is attached to said barb, said barb retraction member having means spaced from said elongated member that is pulled to apply force to said barb to retract same; and
   indicator means spaced from said elongated, hollow member and cooperating with said barb retraction member to indicate when said barb is fully retracted.

4. The invention is accordance with claim 3 further comprising:
   a travel limiting means attached to said barb retraction wire external to said curved, elongated member at said first end thereof, said travel limiting means preventing said barb from bending in a direction opposite to that in which it retracts.

5. A fish hook with a leader for use with a fishing line, said fish hook comprising:
   a curved, elongated member having a first end and a second end, said elongated member having a groove along its outer side
   a flexible barb at the second end of said elongated member;
   a barb retraction wire which is attached to said barb, said barb retraction wire being pulled to apply force to said barb to retract same;
   a clip means attached to said elongated member to hold said barb retraction wire in said groove;

a first indicator element attached to said leader and having a first hole in it through which said barb retraction wire passes and moves freely;

a second indicator element attached to said barb retraction wire and having a second hole in it through which said leader passes and moves freely, and as force is applied to said barb retraction wire to retract said barb said second indicator element moves toward said first indicator element, and when they touch it provides a visual indication that said barb is fully retracted, and a travel limiting means attached to said barb retraction wire external to said curved, elongated member at said first end thereof, said travel limiting means preventing said barb from bending in a direction opposite to that in which it retracts.

6. A fish hook with leader for use with a fishing line, said fish hook comprising:

a curved, elongated, hollow member having a first end and a second end, said hollow member having a hole through it near said first end and said leader is attached to said hole;

a flexible barb at the second end of said hollow member;

a barb retraction wire which is attached to said barb, said barb retraction wire being pulled to apply force to said barb to retract same;

a first indicator element attached to said leader and having a first hole in it through which said barb retraction wire passes and moves freely;

a second indicator element attached to said barb retraction wire and having a second hole in it through which said leader passes and moves freely, and as force is applied to said barb retraction wire to retract said barb said second indicator element moves toward said first indicator element, and when they touch it provides a visual indication that said barb is fully retracted, and a travel limiting means attached to said barb retraction wire external to said elongated, hollow member at said first end thereof, said travel limiting means preventing said barb from bending in a direction opposite to that in which it retracts.

* * * * *